G. G. FORESTER.
AUTOMOBILE HEATING DEVICE.
APPLICATION FILED APR. 20, 1917.
1,291,466.
Patented Jan. 14, 1919.
2 SHEETS—SHEET 1.
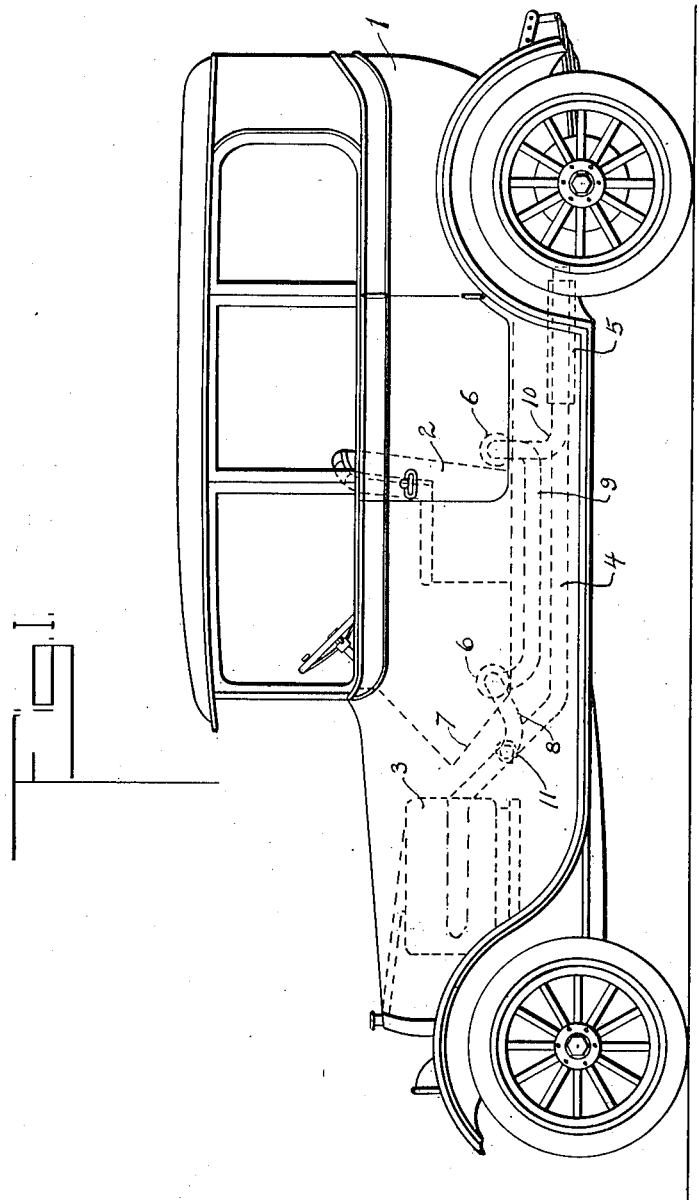
Witness
Franle U. Haskell
Eva E. Williams
Inventor
Gustav G. Forester,
By Walter N. Haskell
his Attorney

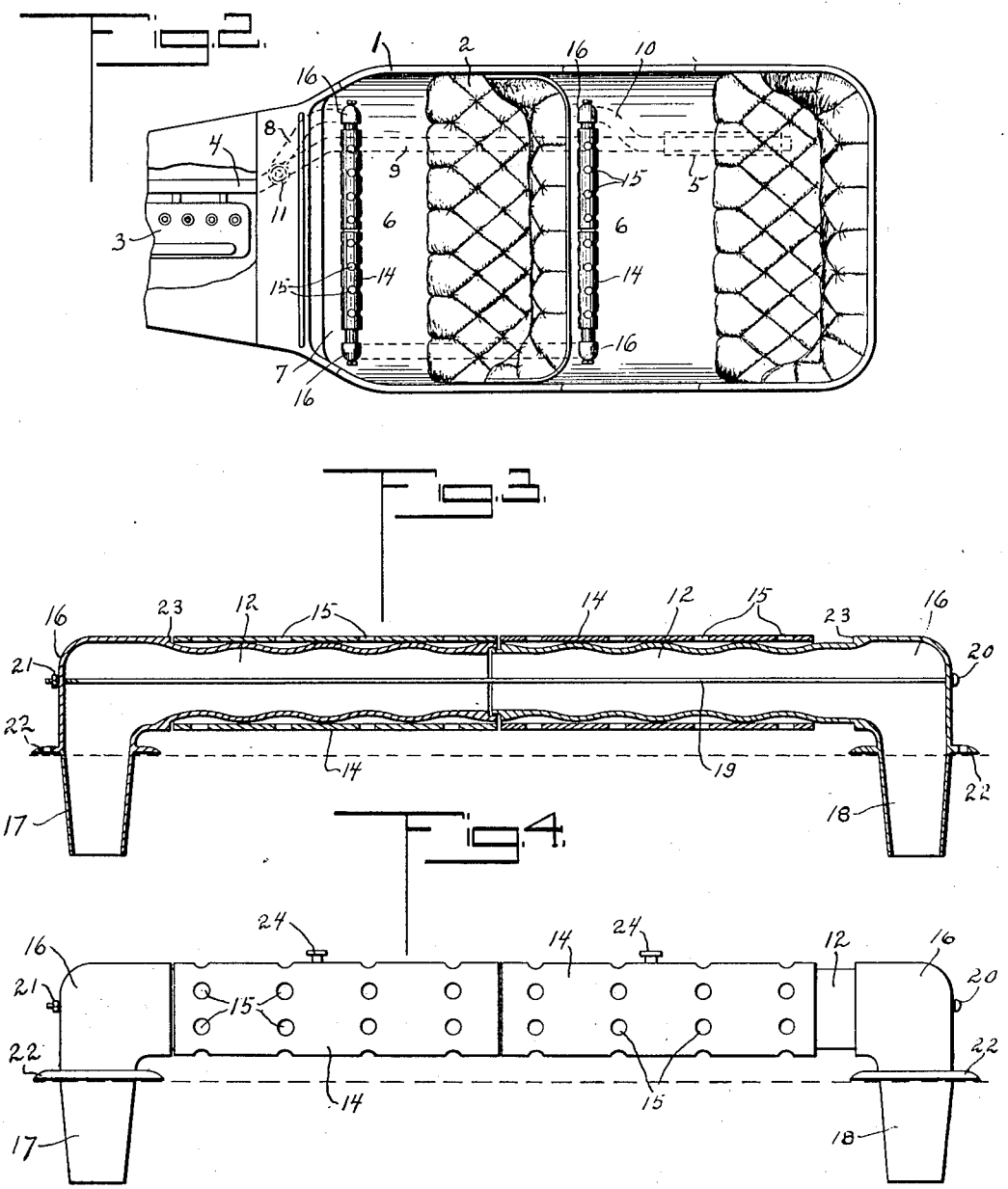

UNITED STATES PATENT OFFICE.

GUSTAV G. FORESTER, OF MOLINE, ILLINOIS.

AUTOMOBILE-HEATING DEVICE.

1,291,466.　　　　　　Specification of Letters Patent.　　Patented Jan. 14, 1919.

Application filed April 20, 1917.　Serial No. 163,353.

*To all whom it may concern:*

Be it known that I, GUSTAV G. FORESTER, a citizen of the United States, residing at Moline, in the county of Rock Island and State of Illinois, have invented certain new and useful Improvements in Automobile-Heating Devices, of which the following is a specification.

My invention pertains to heating devices for automobiles, and other motor driven vehicles, or other conveyances in which the exhaust gases from the engine can be utilized for heating purposes, such as motor-boats, air-ships and the like.

One of the purposes of my invention is to retard the heat and diffuse the same at a desired point in the car, so as to secure a maximum efficiency and heating power therefrom. The construction thereof is such that it can be readily embodied in a system of two or more sections or units, and can be easily adapted for use with other sections, or connected up with the exhaust mechanism of the car. Its sectional form makes the invention of special utility for the purpose of heating the larger classes of auto-vehicles, such as auto-buses.

Another feature of the device consists in means for regulating the supply of heat in the compartment in which the heater is located, by reducing or increasing the amount thereof at the point of supply.

These and other advantages of my invention will more fully appear from the following specification, reference being had to the drawings accompanying the same, in which:

Figure 1 is a side elevation of an automobile of a common type equipped with my invention, with such equipment indicated in broken lines. Fig. 2 is a partial plan view of a car, with the top removed, showing my device installed therein. Fig. 3 is a longitudinal sectional view of my invention. Fig. 4 shows the casing 14, detached.

1 represents an automobile of common closed construction for use in cool weather, provided with two seats, the front one of which is indicated at 2. 3 is the engine and 4 the exhaust pipe therefrom, provided with a muffler 5. The car is shown as equipped with two of my devices, as at 6, one thereof being located just in rear of the foot-board, and the other in rear of the front seat, both of said heaters being just above the floor of the car. A flexible tube 8 connects the forward heater 6 with the exhaust pipe, such tube being connected at one end of the heater, and the opposite end of the heater being connected by a pipe 9 with the other heater 6, from which another flexible tube 10 connects again with the exhaust 4 in front of the muffler 5. The gases in the exhaust pipe may be diverted into the pipe 8 by means of a valve as at 11.

The invention proper is comprised of two tubular sections 12, having a close connection at their inner ends, and provided with corrugations forming alternate air-spaces between such sections and a casing 14 closely inclosing the same and provided with annular series of openings 15, normally in register with said air spaces. Each of the sections 12 is provided with a head 16, one of which has an angular inlet pipe 17 for connection with the exhaust pipe, and the other one of which has a similar outlet pipe 18, for connection with the pipe 9, or the inlet and outlet pipes can be reversed. The sections 12 are held tightly together by means of a rod 19 passing through the heads 16, provided at one end with a head 20, and threaded at the other end to receive a nut 21. The heads 16 are also provided with flanges 22 by means of which the heater can be attached to the floor or other part of the car by means of screws or similar fastening means.

The heads 16 are also provided with stops 23, which are spaced apart a sufficient distance to permit a limited longitudinal movement of the casing 14 on the sections 12. By this means the openings 15 can be moved out of register with the air-spaces 13, and closed by those portions of the pipes 12 which are of the greatest diameter. The radiation of the heat from the sections 12 is thereby reduced in a measure. The casing 14 is preferably formed in two sections, not only for the purpose of convenience of construction, but so as to permit a part or all of the radiation being reduced, as desired.

The pipes 17 and 18 are shown in Fig. 3 as extending in the same direction, as if they both were intended to pass through the floor, but on account of the rotatable relation of the parts 12 with each other, said pipes can be turned in any desired direction, and at any angle with each other. For instance, with the pipe 17 turned vertically downward, as shown in Fig. 3 the pipe 18 can be turned into a horizontal position, or vertically upward, so as to facilitate the connection thereof with another heater or with the sources of supply from the engine. This is accomplished by loosening the nut 21 to such an extent that the sections 12 can be turned independently of each other. One or both of such sections is then rotated until the desired position is attained, and the nut tightened again.

The sections of the casing 14 are provided with knobs 24, to assist in the operation of changing the position of such sections, to open or close the holes 15.

The showing of my invention in the drawings herein in connection with an automobile is merely by way of illustration, and there can be many changes made in the arrangement thereof and in the manner of connecting the same with the heating devices of the car, without departing from the spirit of the invention. In Fig. 1 the heaters 6 are shown in a convenient position for the feet of those riding in the automobile, but they can be placed just in front of the seats, or under the seats, if there is a space suitable therefor. In cars of some construction, such as auto-buses having seats extending longitudinally thereof, the heaters can be arranged in the same manner, one or more thereof being employed on each side of the car.

The exhaust gases from the engine, in passing through one of the devices, are retarded by the corrugations thereof, the heat being thrown outwardly into the spaces 13, and thence through the openings 15. The casing 14 not only operates to communicate the heat to the compartment, and to regulate the same as hereinbefore set forth, but it also acts as a shield, to prevent articles or occupants of the car from being burned through contact with the sections 12. It also aids in retaining the heat in the tubular body of the heater.

The sections 12, heads 16 and connections 17 and 18 are preferably constructed of cast metal, each of such parts, with the head and pipe thereof, being integrally formed.

While in the drawings herein two of my devices have been illustrated, it is obvious that one thereof constitutes a unit for heating purposes, and can be used separately, or can be connected up with any desired number of additional heaters.

On account of the corrugated construction of the sections 12 a considerable obstruction to the passage of the exhaust devices is caused thereby, so that where two or more of the heaters are employed, with the connecting pipes therefor, the return of the gases into the exhaust pipe would be unnecessary, but an outlet could be provided directly to the outside air from the last heater of the system.

It will be apparent that the parts of my device are of simple construction, and can be easily and quickly assembled. The same can also be readily applied to a vehicle already constructed, by securing the same in the desired position, and connecting up with the heating devices of the car. The diameter thereof exceeds that of an ordinary exhaust pipe very slightly, and therefore occupies very little space in the car.

What I claim as my invention, and desire to secure by Letters Patent of the United States, is:

1. A device of the class described, comprising a corrugated pipe, adapted to be connected with the exhaust mechanism of an automobile, and a casing inclosing said pipe, so as to form air-spaces at alternate points between said casing and pipe, said casing being provided with openings normally in register with said air-spaces and movable longitudinally of said pipe to bring said openings out of register with said air-spaces and close the same.

2. In a device of the class described, a corrugated pipe, adapted to be connected with the exhaust mechanism of an automobile, and a casing inclosing said pipe so as to form alternate annular air-spaces between said casing and pipe, and provided with annular series of openings in register with the air-spaces.

3. In a device of the class described, a corrugated pipe, adapted to be connected with the exhaust mechanism of an automobile, and a casing formed in two or more sections, and encircling said pipe so as to form alternate air spaces between said casing and pipe, and provided with outlets for the air from said air-spaces.

4. In a device of the class described, a pipe formed of two sections rotatably united at their ends, and provided with angular connecting members, and means for uniting said sections so as to hold the same tightly together or permit them to rotate with relation to each other, as desired.

5. A device of the class described, comprising two or more heaters, consisting of a central corrugated body and a casing inclosing the same, angular connecting members at the ends of said heaters independently rotatable, and connecting devices for uniting said heaters so as to permit the continuous passage of air through the same.

6. In a device of the class described, a pipe formed of two sections rotatably united and provided with angular end portions, said pipe being formed of alternate large and small diameters; a casing inclosing said pipe and provided with openings opposite the smaller diameters of said pipe; and a rod held in said end portions, extending through said pipe, and provided with means for increasing the tension thereof, to hold said sections tightly together.

In testimony whereof I affix my signature in the presence of two witnesses.

GUSTAV G. FORESTER.

Witnesses:
W. N. HASKELL,
HENRY C. SCHAFFER.